United States Patent [19]
Burgoon

[11] Patent Number: 5,635,085
[45] Date of Patent: Jun. 3, 1997

[54] APPARATUS AND METHOD FOR NARROW GROOVE WELDING

[75] Inventor: Charles E. Burgoon, Kenosha, Wis.

[73] Assignee: Westinghouse Electric Corporation, Pittsburgh, Pa.

[21] Appl. No.: 354,395

[22] Filed: Dec. 12, 1994

Related U.S. Application Data

[63] Continuation-in-part of Ser. No. 23,794, Feb. 25, 1993, Pat. No. 5,373,139.

[51] Int. Cl.$^6$ ............................................. B23K 9/167
[52] U.S. Cl. ........................... 219/74; 219/75; 219/136
[58] Field of Search ............................... 219/74, 75, 136, 219/137.42

[56] References Cited

U.S. PATENT DOCUMENTS

| | | | |
|---|---|---|---|
| 3,053,968 | 9/1962 | Gorman et al. | 219/74 |
| 3,125,666 | 3/1964 | Gorman et al. | 219/74 |
| 3,180,967 | 4/1965 | Hill | 219/75 |
| 3,349,213 | 10/1967 | Gorman | 219/74 |
| 3,450,857 | 6/1969 | Webb | 219/74 |
| 3,534,199 | 10/1970 | Downey et al. | 219/60 A |
| 3,826,888 | 7/1974 | Garfield et al. | 219/74 |
| 4,300,034 | 11/1981 | Schneider et al. | 219/74 |
| 4,567,343 | 1/1986 | Sullivan et al. | 219/74 |
| 4,581,518 | 4/1986 | Takahashi et al. | 219/136 |
| 5,393,948 | 2/1995 | Bjorkman, Jr. | 219/74 |

FOREIGN PATENT DOCUMENTS

| | | | |
|---|---|---|---|
| 3728186 | 6/1988 | Germany | 219/74 |
| 57-85678 | 5/1982 | Japan | 219/137.42 |
| 2-235578 | 9/1990 | Japan | 219/74 |
| 903016 | 2/1982 | U.S.S.R. | 219/74 |

*Primary Examiner*—Clifford C. Shaw
*Attorney, Agent, or Firm*—David G. Maire

[57] ABSTRACT

Narrow groove welding is accomplished with a welding apparatus containing an improved gas lens made of a sintered bronze material. The sintered bronze material requires the use of a higher gas supply pressure than is commonly used, but it results in a higher volume of laminar gas flow, thereby facilitating deep narrow groove welds. The sintered gas lens does not require the use of a skirt below the lens to maintain a column of laminar gas flow, thereby making it possible to mount a light source below the lens directly within the flow of cover gas and away from the line of view of the operator.

14 Claims, 10 Drawing Sheets

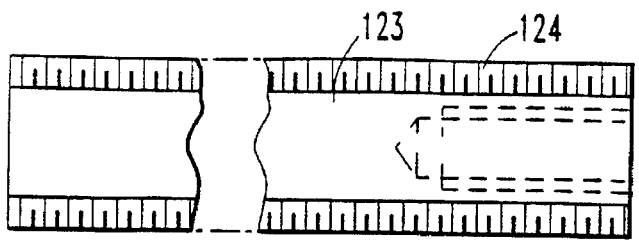
FIG.14
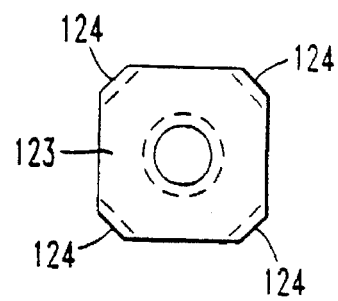
FIG.15
FIG.13
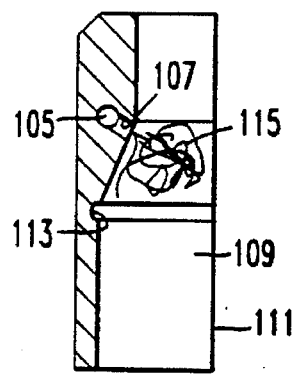
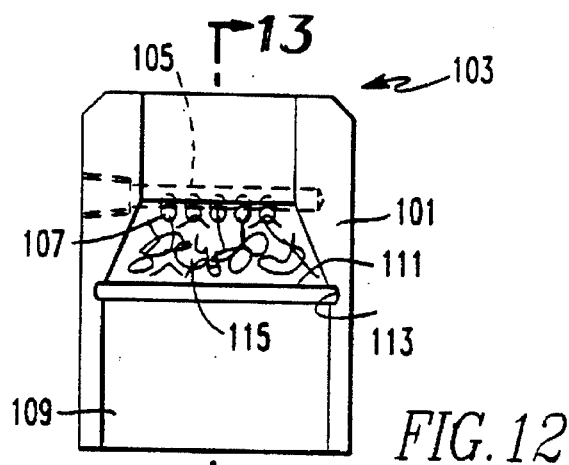
FIG.12
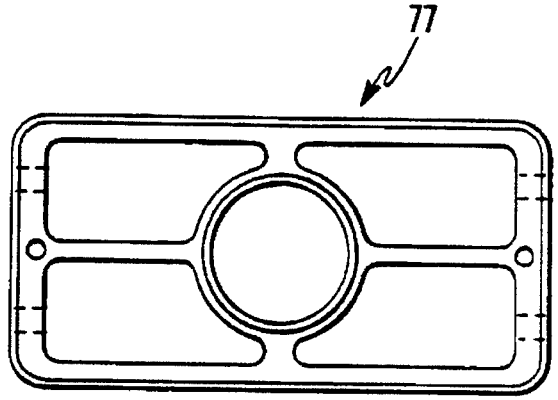
FIG.10
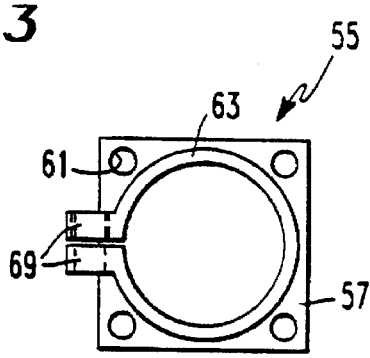
FIG.8
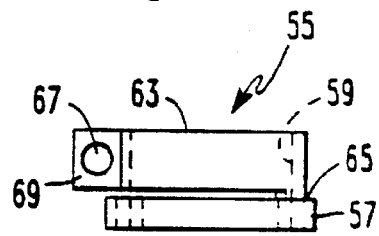
FIG.9

APPARATUS AND METHOD FOR NARROW GROOVE WELDING

CROSS-REFERENCE TO RELATED APPLICATIONS

This invention is a continuation in part of application Ser. No. 08/023,794, filed on Feb. 25, 1993, now U.S. Pat. No. 5,373,139.

BACKGROUND OF INVENTION

1. Field of Invention

This invention relates to apparatus and method for welding, and in particular to narrow groove welding using conventional welding equipment with a secondary gas cap which provides a large envelope of turbulent free cover gas over the weld puddle and which can be used to make complete deep narrow groove welds including the weld cap.

2. Background Information

Narrow groove welding is a term applied to welding in a v-shaped groove formed between the parts to be joined which has a "narrow" included angle. This technique is also referred to, especially in Europe, as narrow gap welding. While there is no precise definition of "narrow", welding with a groove having an included angle of less than about 50° and certainly less than about 20° is considered narrow groove welding. The obvious advantages of narrow groove welding are that less welding is required and it is therefore faster and uses less material. The implementation of the technique has not been totally satisfactory for field welding applications, however.

An important shortcoming of the implementations of narrow groove welding to date is that specialized equipment is required. A common arrangement for narrow groove welding utilizes a special elongated narrow gas cup referred to as a "chisel" cup. Typically, the torch block is customized to carry this chisel cup which surrounds the welding electrode and lays down an envelope of cover gas over the weld puddle. The envelope of cover gas delivered by this chisel cup is not very large and is vulnerable to drafts when outside the groove so that it is necessary to change the gas cup, and therefore, in some cases the torch block, to complete the weld cap. It also limits the operator's view of the weld puddle.

Another arrangement for narrow groove welding utilizes a specially designed circular, telescoping gas cup mounted on a customized torch block. After each several passes, the telescoping gas cup is incrementally retracted to accommodate reduction in penetration of the electrode into the groove. Typically these cups do not have sufficient cross sectional area to provide a large enough shielding envelope for welds deeper than approximately 3 inches.

There is a need for an improved apparatus and method for narrow groove welding.

There is a need for such an apparatus and method which can make deeper welds than presently possible with narrow groove welding equipment and which does not require a change in equipment to complete the weld cap and which improves the usability to the operator.

There is a further need for such a method and apparatus which can be utilized with conventional welding torches and consumables, both mechanized and manual.

SUMMARY OF THE INVENTION

These and other needs are satisfied by the invention which is directed at an apparatus for welding parts fitted together with a narrow welding groove having a welding torch; a welding electrode extending from the welding torch and into the welding groove and operable to form a weld puddle at a bottom of the welding groove; means substantially outside of the welding groove for directing a laminar flow of cover gas along the electrode and into the welding groove to maintain an effective envelope of the cover gas covering the weld puddle; the means for directing gas further having a gas lens made from a sintered material. The sintered material may be sintered bronze. A back pressure of 50–150 psig may be supplied to the sintered material gas lens, with one or more sparger supplying the gas to a gas chamber behind the gas lens. No skirt is required to maintain the cover gas in a laminar column, therefore, a light source may be mounted under the lens directly within the flow of laminar cover gas.

BRIEF DESCRIPTION OF THE DRAWINGS

A full understanding of the invention can be gained from the following description of the preferred embodiments when read in conjunction with the accompanying drawings in which:

FIG. 8 is a plan view of a mount for the secondary gas cup.

FIG. 9 is a side view of the mount of FIG. 8.

FIG. 10 is a plan view of the female screen holder for the secondary gas lens.

FIG. 12 is a side view of one-half of a second embodiment of the secondary gas cup.

FIG. 13 is a vertical section through the secondary gas cup of FIG. 12 taken along the line 13—13.

FIG. 14 is a side view of a manipulator post in accordance with the invention.

FIG. 15 is an end view of the manipulator post of FIG. 14.

DESCRIPTION OF THE PREFERRED EMBODIMENTS OF THE INVENTION

The invention will be described as applied to and as utilizing mechanized welding apparatus, although it will be appreciated by those skilled in the art that the invention is equally applicable to manual welding apparatus. An important feature of the invention is that it can be applied to a wide variety of currently available conventional welding apparatus.

Figure 1:
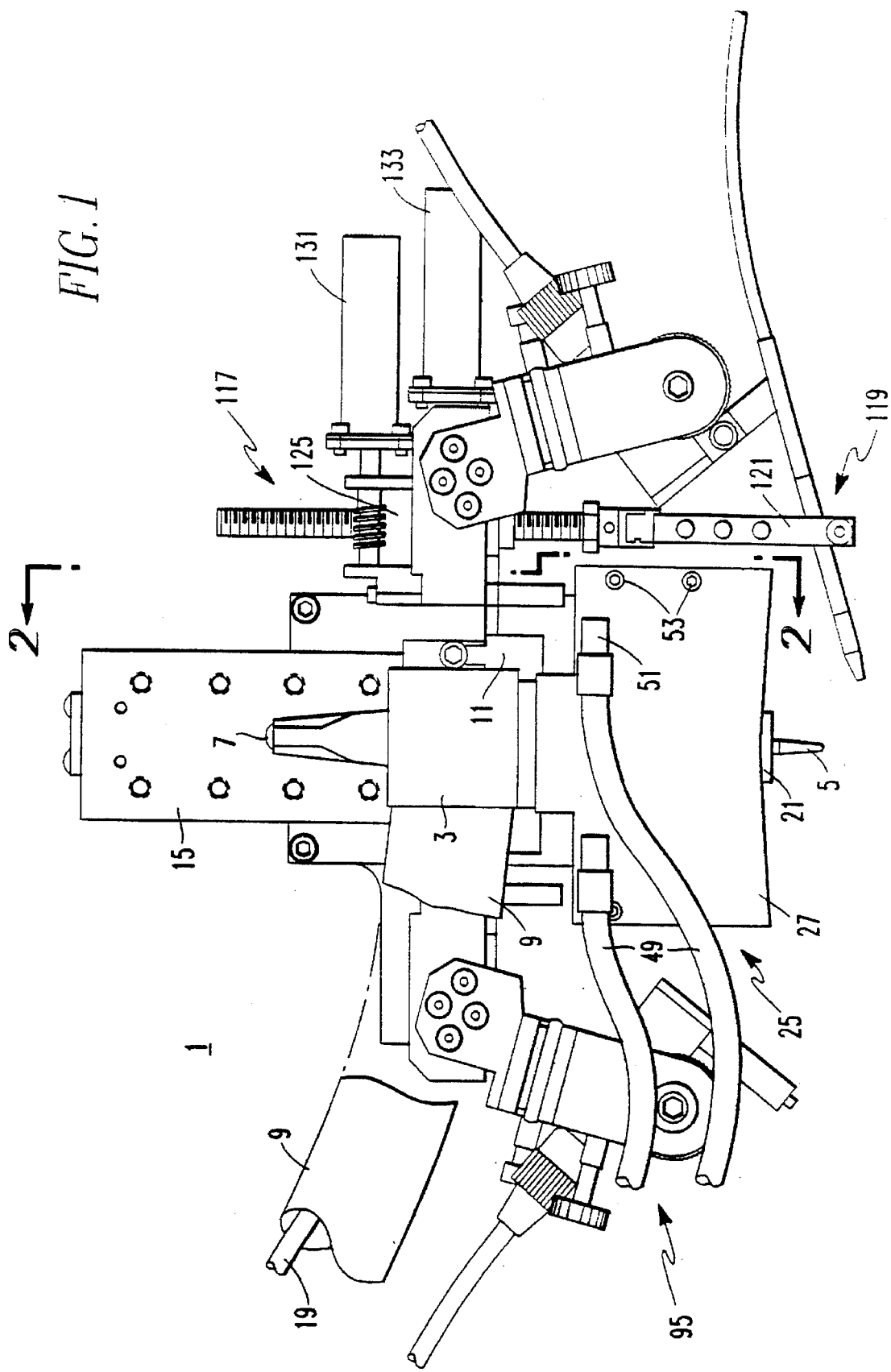
FIG. 1 is a front elevation view of a front end of a mechanized welding machine incorporating the invention.
Figure 2:
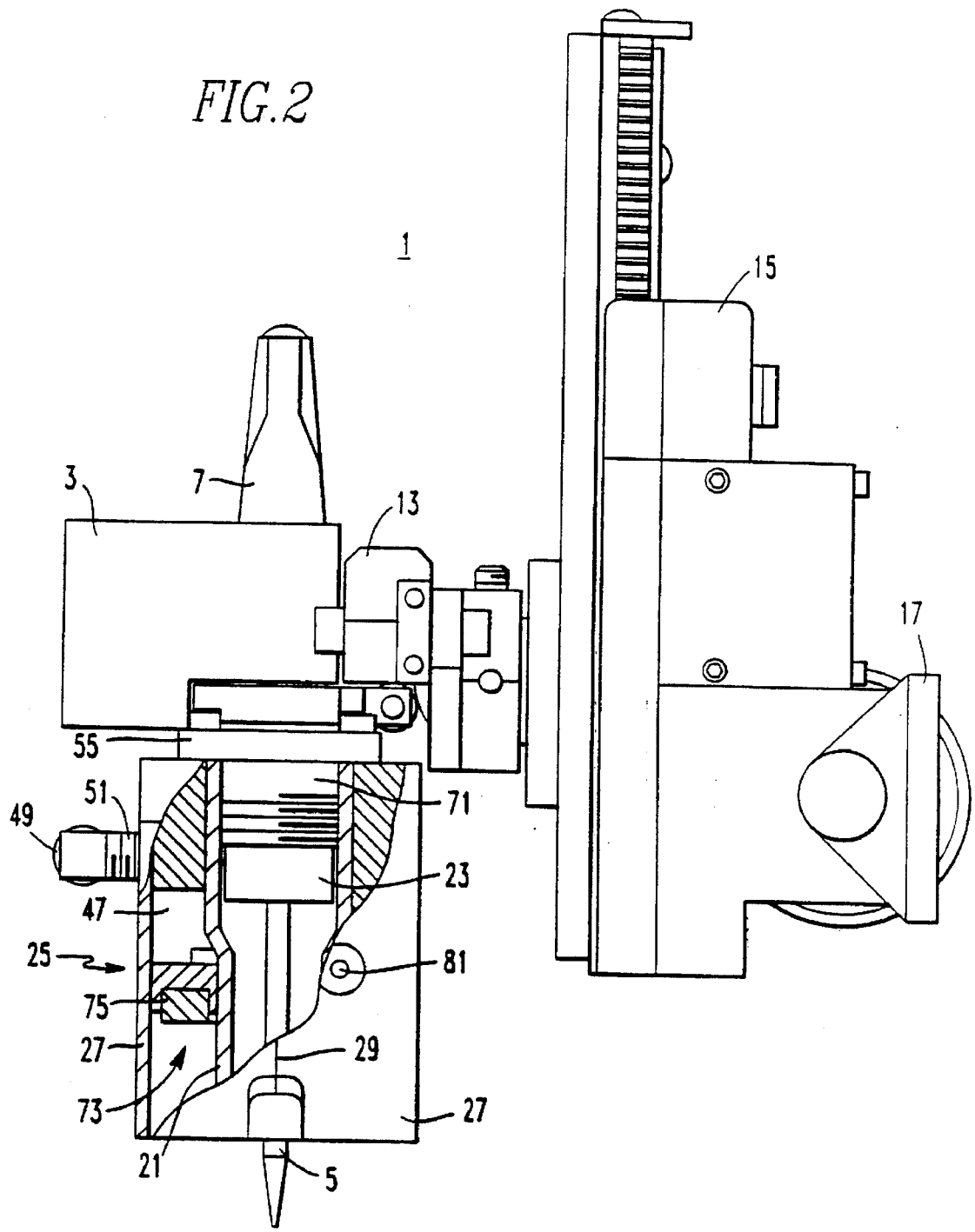
FIG. 2 is a side elevation view taken along the line 2—2 in FIG. 1.
Figure 3:
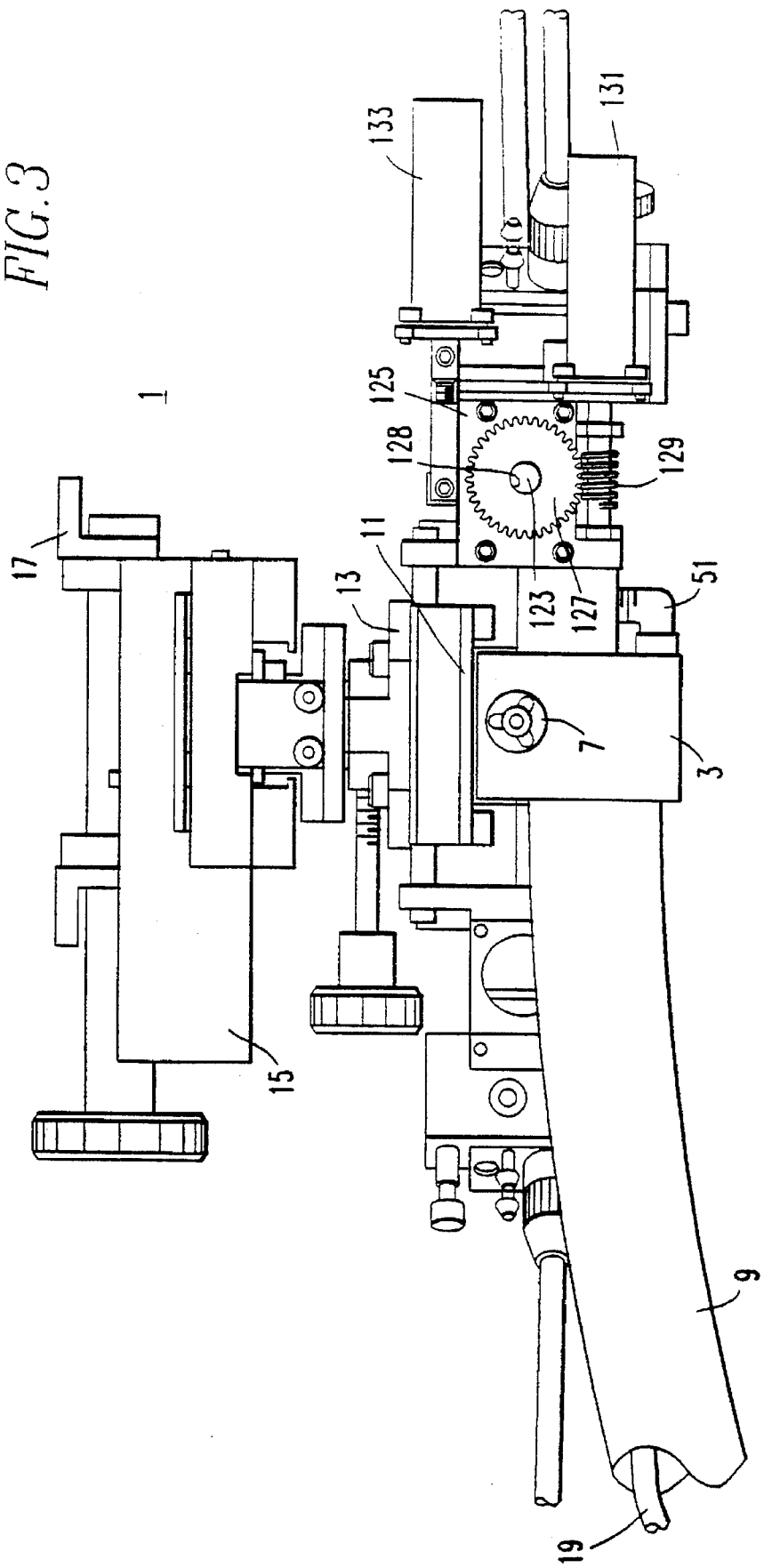
FIG. 3 is a plan view of the front end assembly shown in FIG. 1.

Referring to FIGS. 1–3, the front end assembly 1 has a bracket 3 for attaching and supporting the front end assembly 1 to a tractor mechanism (not shown) of the motorized welding apparatus. The heart of the front end assembly 1 is a torch block 3 which supports and provides energization to a welding electrode 5. A back cap 7 cooperates with a collet (not shown) within the torch block 3 to clamp the electrode for selective extension of the electrode downward from the torch block.

The torch block 3 provides electrical energization to the electrode 5. Electric power is supplied to the torch block 3 through a torch cable 9. The torch cable 9 also contains conduits (not shown) which circulate cooling water through the torch block 3 to remove heat generated within the torch block. The torch block 3 is mounted through an insulator block 11 to a torch mounting bracket 13. The mounting bracket 13 is carried by a motorized vertical axis assembly (MVAA) 15 which raises and lowers the front end assembly 1 as seen in FIGS. 2 and 3 for adjusting the length of the arc struck by the electrode during welding. The MVAA 15 in turn is carried by a mounting bracket 17 which secures the front end assembly 1 to a tractor mechanism (not shown) of the motorized welding apparatus. As is known in the art, the front end assembly 1 provides several degrees of freedom for adjusting the position and orientation of the electrode 5 relative to the parts to be welded.

The torch block 3 also supplies a cover gas for the welding process. This cover gas is supplied to the torch block 3 through a conduit 19 within the torch cable 9. Typically, argon is used as an inert cover gas. This first flow of cover gas is directed by a primary gas cup 21 along the electrode 5. This first flow of cover gas is delivered to the primary gas cup 21 through a conventional gas lens 23 which extends downward around the electrode 5 from the torch block 3. The primary gas cup 21 is tubular and internally threaded to engage external threads on the primary gas lens 23.

Figure 4:
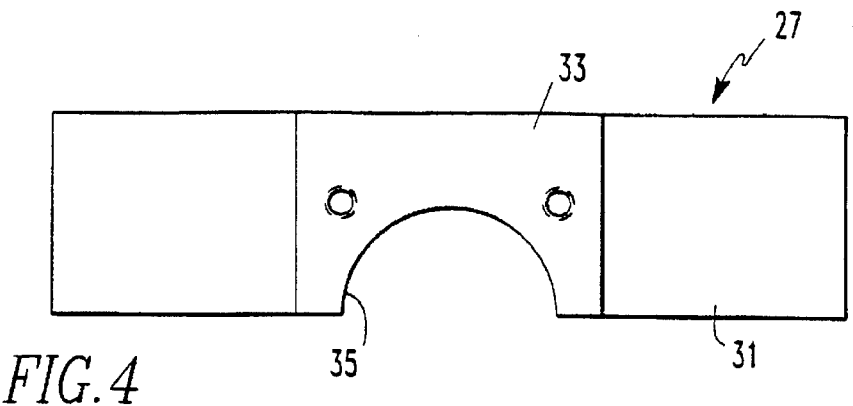
FIG. 4 is a plan view of one-half of a secondary gas cup which forms part of the front end assembly shown in FIGS. 1–3.
Figure 5:
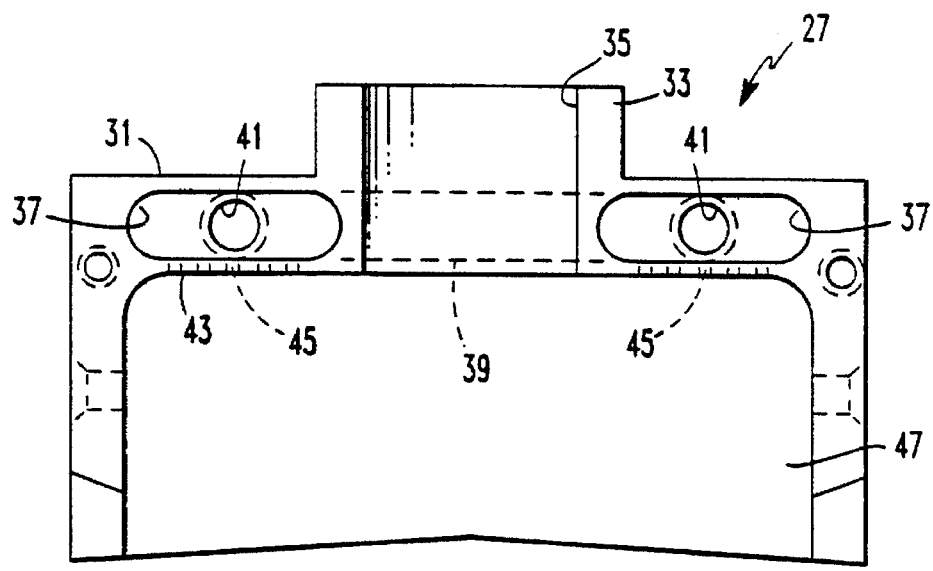
FIG. 5 is a side view looking into the half of the secondary gas cup shown in FIG. 4.
Figure 6:
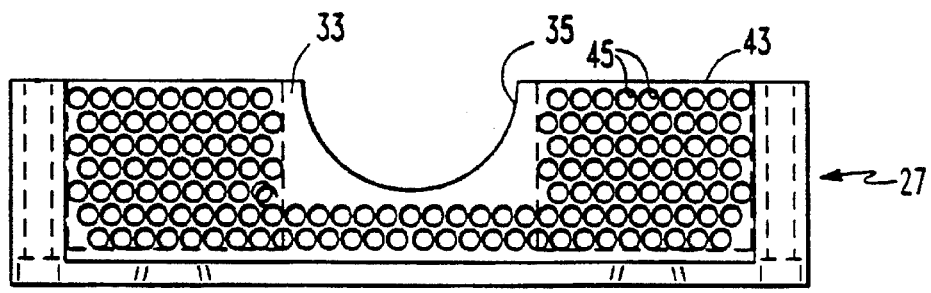
FIG. 6 is a bottom view of the one-half of the secondary gas cup shown in FIGS. 4 and 5.

The portions of the front end assembly 1 described to this point are conventional and well known in the art. In order to adapt this conventional welding equipment for narrow groove welding, a secondary gas cup 25 is provided. This secondary gas cup 25 surrounds the primary gas cup 21. As can be seen from FIGS. 4–6, the secondary gas cup 25 in a preferred embodiment, is formed from two body halves 27 which join at a central, longitudinally extending parting line 29. Each body half 27 has an end wall 31 with a raised center section 33 having a semi-circular bore 35 therethrough. These end walls have transverse passages 37 which are intersected by a plugged longitudinal bore 39. The right body half 27 shown in FIGS. 3–6 has a pair of threaded ports 41 in side wall 43 which communicate with the transverse passages 37. As seen in the bottom view of FIG. 6, thin portions 43 of the end wall 31 have a number of small apertures 45 which interconnect the transverse passages 37 and the longitudinal bores 39 with a main flow chamber 47. As can be seen in FIGS. 2 and 3, a pair of hoses 49 are connected through fittings 51 threaded into the ports 41 to supply additional inert gas which circulates through the transverse passages 37 and longitudinal bores 39 and is diffused into the main flow chamber 47 through the apertures 45.

The two body halves 27 of the secondary gas cup 25 are joined together along the parting line 29 by screws 53. The assembled secondary gas cup slides over the primary gas cup 21 which extends through the confronting semicircular bores 35. The secondary gas cup is secured in place by a mount 55. This mount which is best seen in FIGS. 8 and 9 has a square base plate 57 with a circular opening 59 in the center which is secured to the raised sections 33 on the body halves 27 by screws 61. A clamp 63 is secured at 65 to the base plate 57. A bolt 67 threaded through ears 69 in the clamp 63 secures the secondary gas cup 25 coaxially around the shield 71 or primary gas cup 23.

The secondary gas cup 25 is provided with a secondary gas lens 73. The secondary gas lens includes screens 75 clamped between a female screen holder 77 (see FIG. 10) and a complimentarily configured male screen holder 79 (see FIG. 3). The secondary gas lens 73 is secured in the main flow chamber 47 within the secondary gas cup 25 by screws 81. Flow of the additional inert cover gas through the secondary gas lens 73 produces laminar flow around the laminar flow of covered gas produced by the primary gas cup 21 and its gas lens 23.

Figure 7:
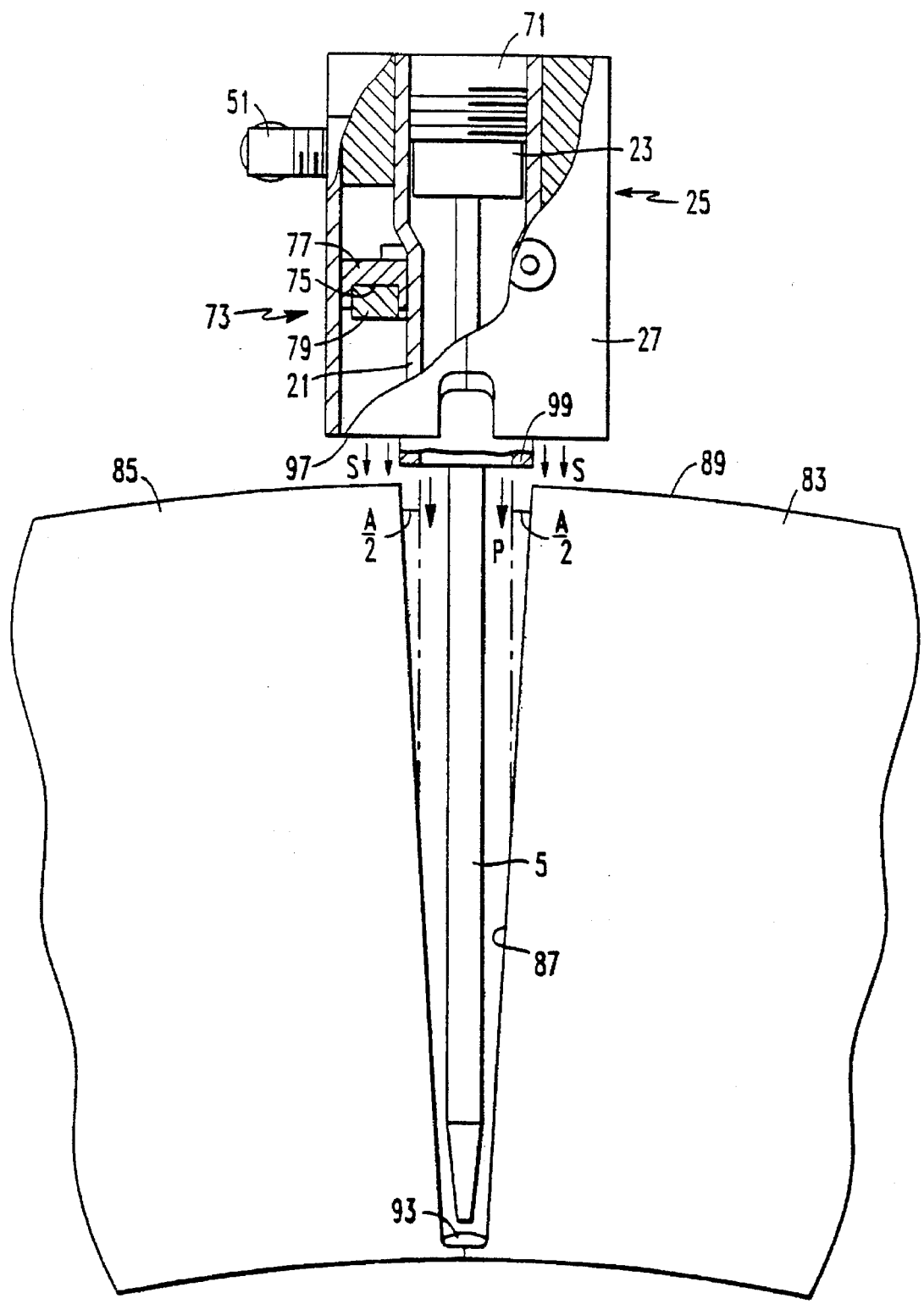
FIG. 7 is a section through a work-piece prepped for narrow groove welding and showing the welding apparatus of the invention in place for welding.
Figure 11:
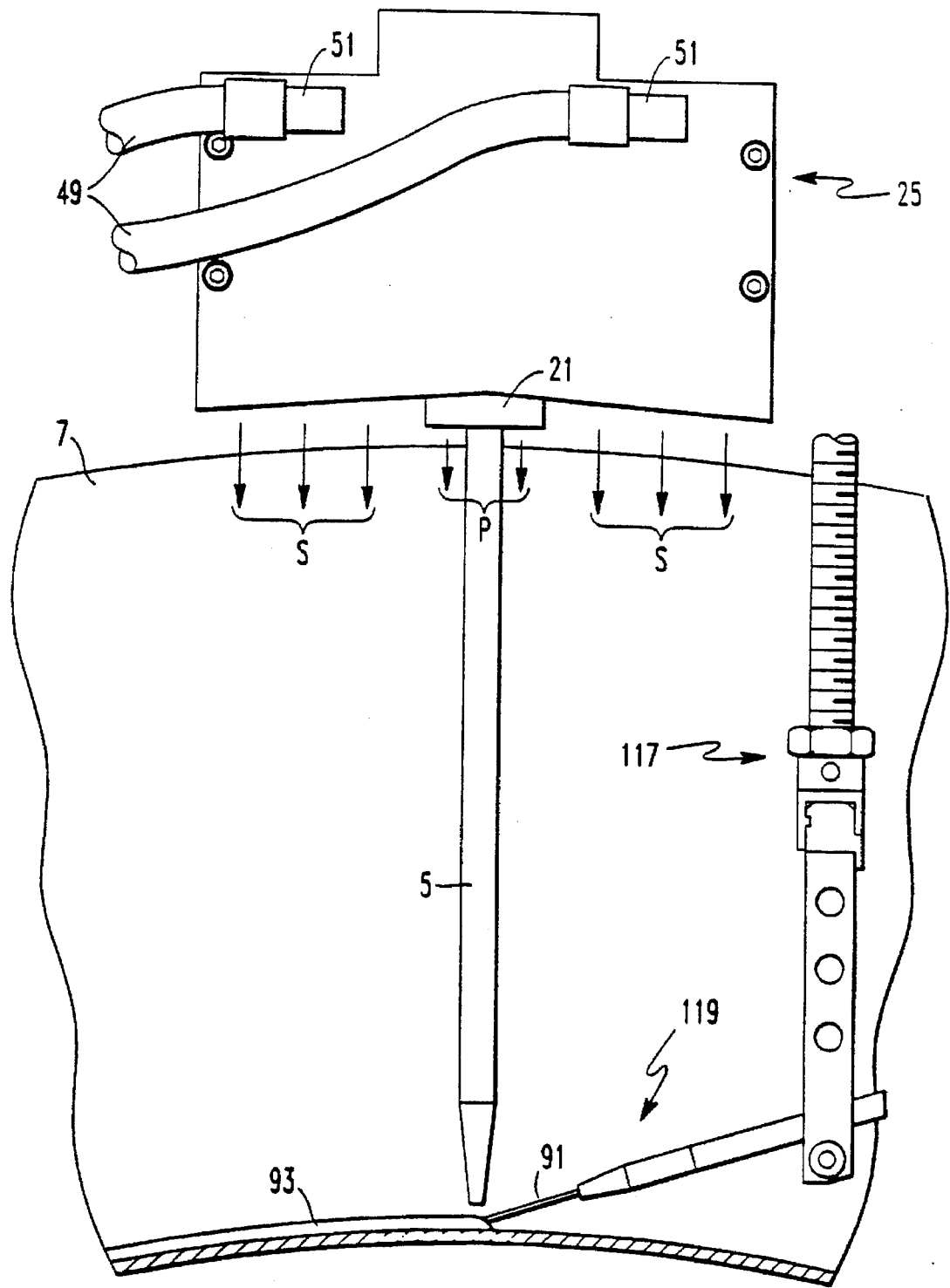
FIG. 11 is a longitudinal section through the narrow groove of FIG. 7.

FIG. 7 shows the pertinent parts of the welding apparatus of the invention in place for performing a narrow groove weld. The work pieces 83 and 85 to be joined are prepped to form a narrow groove 87 where fitted together as shown. Each side of the groove 87 forms an angel A/2 which together for an included A. In the exemplary work-piece shown, this included angel A is about 6°. As discussed above narrow grooves generally form an included of less than about 20° up to 50°. As shown in FIG. 7 the front end assembly is positioned so that the electrode 5 extends into the narrow groove 87 with the primary gas cup 21 and secondary gas cup 25 spaced just above the upper surface 89 of the work pieces 83–85. As shown in FIG. 11, which is a longitudinal view through the narrow groove 87 shown in FIG. 7, the electrode 5 strikes an arc which melts welding wire 91 to form a weld puddle 93.

A cover gas for welding processes is provided by a gas distribution system 95 which includes the conduit 19 supplying gas to the primary gas cup 21 and the hoses 49 supplying additional cover gas to the secondary gas cup 25. The laminar flow of cover gas from the primary gas cup 21 is shown in FIGS. 7 and 11 by the arrows P, is surrounded by a second diameter gas flow from a secondary gas cup 25 indicated by the arrows S. These combined gas flows P and S form a large envelope of laminar gas flow which provides effective cover gas for deep narrow groove welds.

The large secondary gas cup 25 has a flow opening 97 which has at least three times and preferably four to ten times, the cross-sectional area of the flow opening 99 of the primary gas cup 21. Also, the flow rate of the second gas flow from the secondary gas cup 25 is at least about twice and preferably 2.5 to 10 times the rate of gas flow from the primary gas cup 21 depending on the diameter of the primary gas cup. Typically, the primary gas cup has a flow rate of about 40–70 CFH while the flow rate from the secondary gas cup is about 150–300, but preferably 200–250 CFH. Of course, the specific gas flow rates are related to the size of the flow openings of the respective gas cups. However, these exemplary figures illustrate suitable relative flow rates. An important factor is that the cover gas flow be laminar to assure good welds.

In making deep narrow groove welds it is preferred that the rectangular secondary gas cup have unequal length adjacent sides as shown in FIGS. 1–7. However, for shallower narrow groove welds the rectangular secondary gas cup can be square.

An example of a body of 101 for a square secondary gas cup 103 is shown in FIGS. 12 and 13. Each body half 101 has a transverse bore 105 with apertures 107 leading to the main flow chamber 109. A screen plate 111 seated in a groove 113 in the body half 101 retains steel wool within the secondary gas cup 103 to form a gas lens for laminar flow.

Returning to FIGS. 1–3 the front end assembly 1 also supports a weld-wire manipulator 17. This manipulator 17 includes a wire nozzle assembly 119 through which weld-wire is feed toward the electrode 5. This wire nozzle assembly 119 is supported by a nozzle holder 121. This nozzle holder 121 in turn is suspended by a unique manipulator post 123 as shown in FIG. 14 and 15. This post 123 is a square rod with threads 124 only on the corners which, as discussed below, prevents counter-rotation of the post during extension and retraction. The manipulator post 123 extends through a housing 125 and engages a gear 127 which is captured in the housing. This gear 127 has a threaded aperture 128 which engages the threads on the corners of the manipulator rod 123 to raise and lower the rod and therefore the wire nozzle assembly 119. The gear 127 is rotated through a worm gear 129 on the output shaft of a motor 131 which can be operated to automatically position the nozzle assembly 119 vertically. A second motor 133 selectively rotates the square manipulator shaft 123 about its axis.

Figure 16:
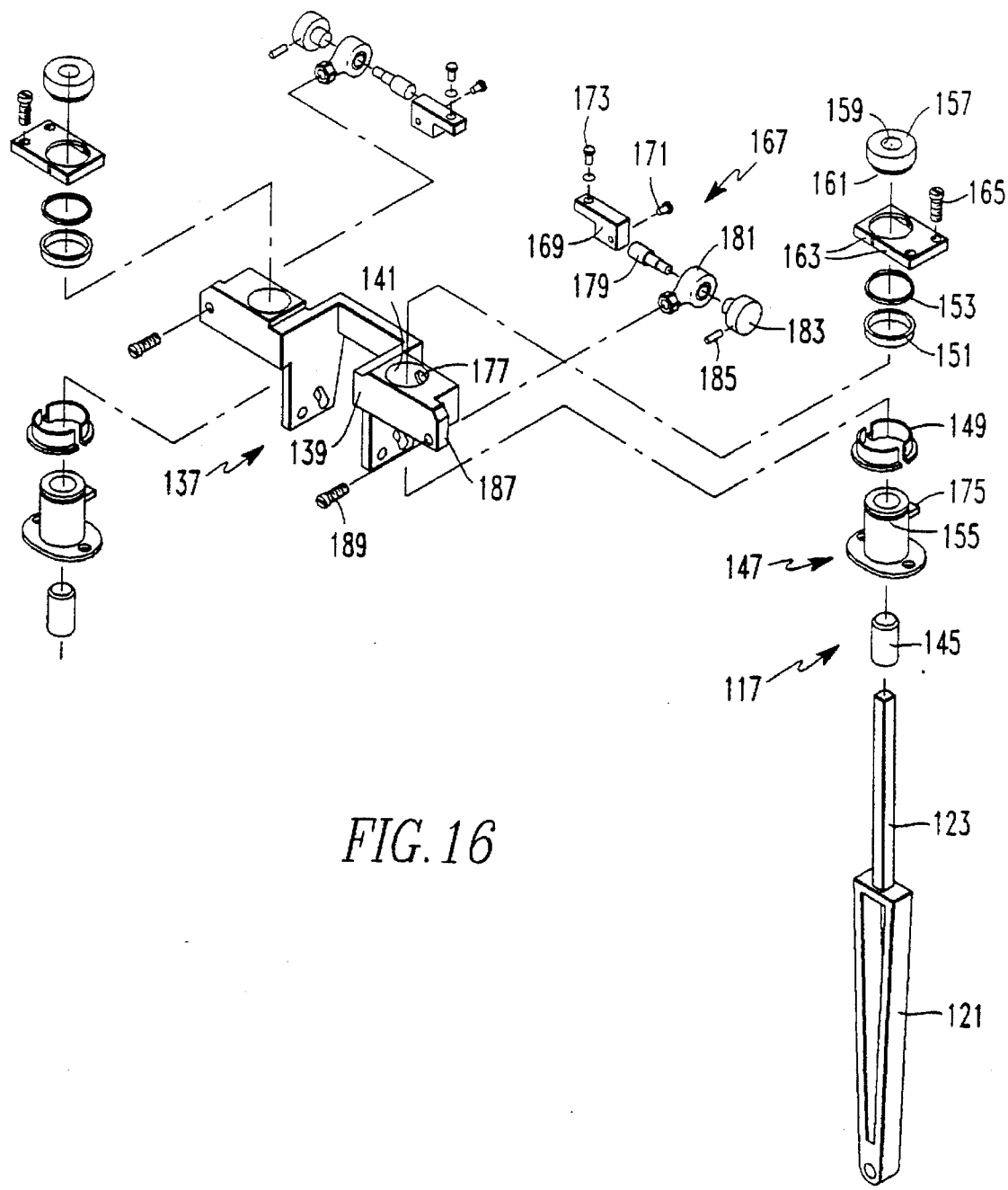
FIG. 16 is an exploded view of a manual wire manipulator in accordance with the invention.

FIG. 16 is an exploded view of a manual embodiment of the wire manipulator. This manual manipulator 135 includes a bracket 137 which is mounted to the torch block. The bracket 137 mount identical manual manipulators 135 on each side of the torch block. Since these manual manipulators are identical, only one will be described.

The bracket 137 has an arm 139 with a bore 141 therethrough which forms a housing. As can be seen in FIGS. 14 and 15 the square manipulator post 123 has threads 124 on the corners. This square post slides through a square opening in a cylindrical brass bushing 145 which is press fit into a pivot cylinder 147. A split lower bearing 149 which bears against a flange 151 on the lower end of the pivot cylinder 147 and an upper bearing 51 secured by a snap ring 153 which seats in a groove 155 in the pivot cylinder 147 lock the pivot cylinder in the bore 141. An knob 157 with a threaded bore 159 which engages the manipulator post 123 has a groove 161 which is engaged by the two halves 163 of a locking plate secured by screws 165 to the arm 139 to capture the knob 157. Rotation of the captured knob 157 raises and lowers the manipulator post 123. The post 123 is of sufficient length to provide full extension for deep welds. This is a marked improvement over presently available manipulators which have short stems which require changing manipulator rods as the weld is built up.

Angular adjustment of the manipulator nozzle assemble 119 about the axes of the manipulator post 123 is achieved by an adjustment device 167. This adjustment device includes a bellcrank 169 pivotally mounted on the arm 139 by a screw 171 and secured by a screw 173 to a crank arm 175 which protrudes through a lateral bore 177 in the arm 139. An actuating rod 179 is threaded at one end into the bellcrank 169 and at the other end passes through a brass eyebolt 181 and is captured in a knob 183 by a pin 185. The eyebolt 181 is pivotedly mounted to a flange 187 on the arm 139 by screw 189. Rotation of the knob 183 causes rotation of the pivot cylinder 147 which rotates the square manipulator post 123 to adjust the angular position of the nozzle assemble 119.

Figure 17:
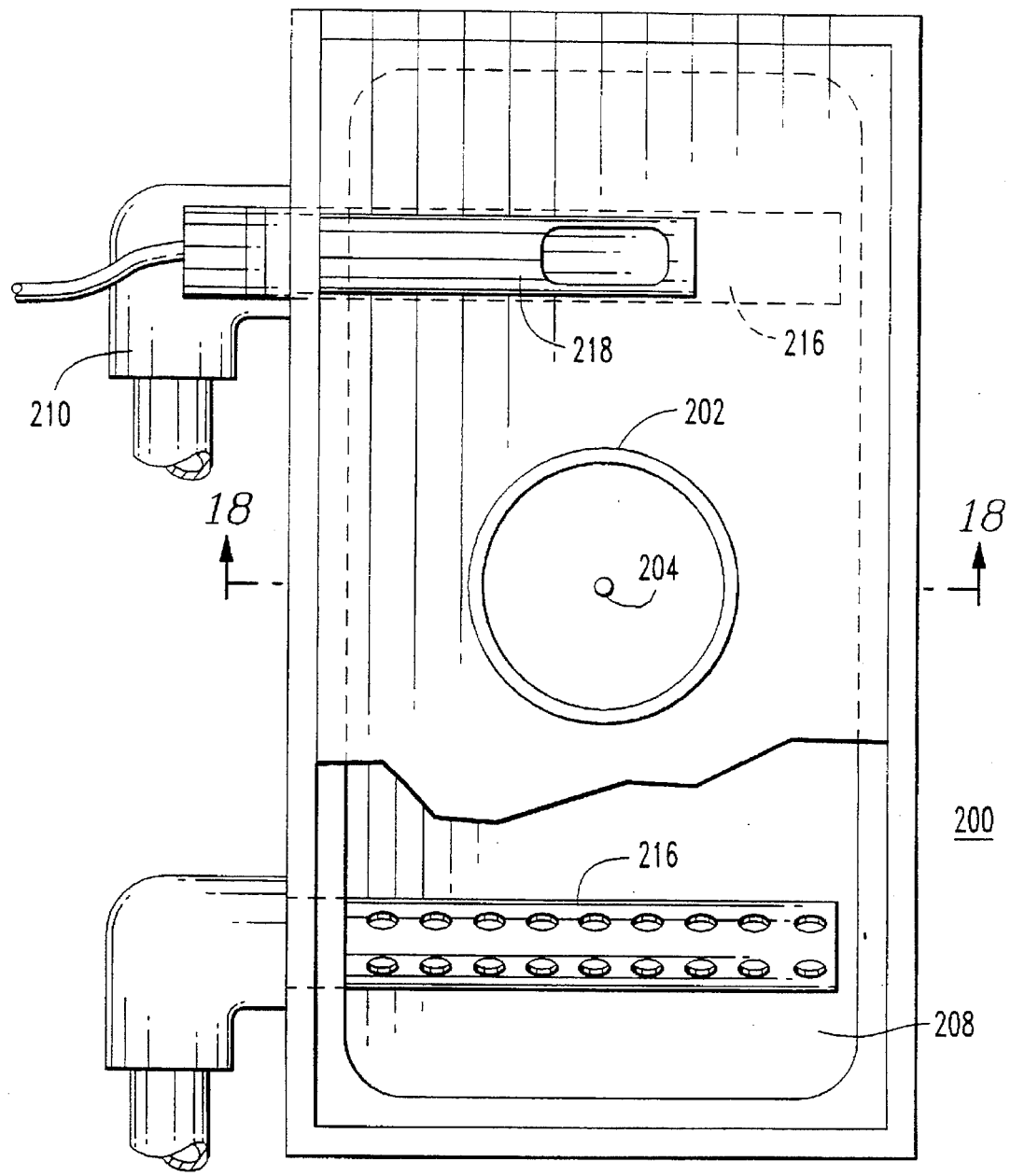
FIG. 17 is a bottom view of welding apparatus built in accordance with this invention.
Figure 18:
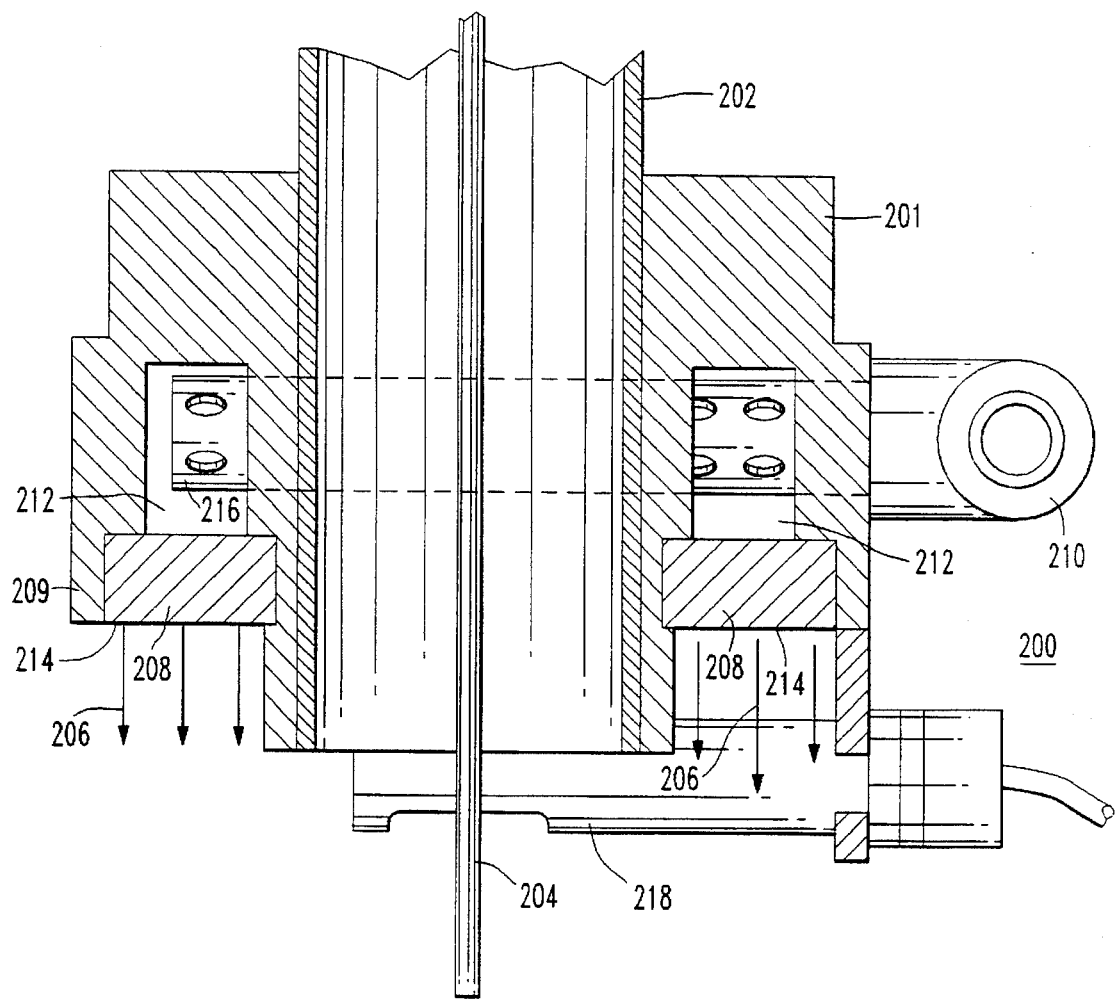
FIG. 18 is a vertical sectional view taken along line 18—18 of FIG. 17.

FIGS. 17 and 18 illustrate an embodiment of the invention which utilizes an improved gas lens. The apparatus 200 of FIGS. 17 and 18 contains a housing 201 mounted around a torch 202 having an electrode 204 extending therefrom which is operable to extend into a narrow welding groove (not shown) and to form a weld puddle at the bottom of the groove. The torch may be a tungsten inert gas (TIG) welding torch, for example. A wire feed mechanism (not shown) may also be used with apparatus 200 to supply weld wire to the weld puddle. A laminar flow of cover gas 206 for enveloping the weld puddle is supplied along the electrode 204 through a gas lens 208, which in this embodiment is a highly reticulated, porous material which provides a relatively high resistance to gas flow, for example a sintered bronze material. The gas lens 208 is attached to the discharge end 209 of housing 201. The cover gas 206 is delivered to the gas lens 208 from a gas supply connection 210 into a gas flow chamber 212 formed within the housing 201 and in fluid communication with the gas lens 208. The entire apparatus 200, with the exception of the electrode 204, is located substantially outside of the welding groove.

Because they offer very little flow resistance, prior art gas lenses tend to allow the majority of the cover gas to flow in the areas closest to the point of supply of the cover gas, resulting in an uneven flow distribution across the face of the gas lens. Turbulent flow can result from such an unequal flow rate, especially as the flow rate is increased. The sintered material gas lens 208 of FIGS. 17 and 18 resists the flow of the cover gas and creates a back pressure in the gas flow chamber 212, and the equalization of the pressure in the gas flow chamber 212. As a result of this back pressure and the porous nature of the sintered material, there is an essentially uniform flow velocity exiting the gas lens 208 as measured across the face 214 of the gas lens 208. As a result of the more uniform flow rate passing through the sintered material gas lens 208, the flow of cover gas 206 can be maintained as a laminar flow at a higher flow rate than with prior art lenses. For example, prior art argon gas metering systems typically operate in the 30–40 psig range. It has been found that using a sintered bronze gas lens, an effective volume of laminar gas flow can be produced by using gas pressures in the range of 50–150 psig, or for example, 75–100 psig or 100–150 psig. One embodiment has been constructed using a gas pressure of approximately 125 psig in the gas flow chamber 212, and a 34–90 micron sintered bronze gas lens approximately one quarter inches in thickness (i.e. in the direction of the flow of cover gas 206). This design is capable of providing a higher laminar flow rate than that of a prior art lens having the same face 214 area allowing for welding in deeper/wider narrow groove weldment designs. With this design it has also been determined that it is not necessary to use a peripheral skirt around the outside of the cover gas flow 206 in order to maintain the flow in a columnar form. (Such a skirt is shown, for example, in the portion of the body half 27 extending below the screen 75 in FIG. 2.) In the embodiment of FIGS. 17 and 18, the discharge end 209 of the housing 201 terminates substantially at the location of the gas lens 208.

To further ensure that the flow rate of cover gas 206 is uniform across the face 214 of the gas lens 208, one or more spargers 216 can be installed in the gas flow chamber 212. Spargers 216 are connected to the gas supply connections 210, and function to distribute the incoming cover gas to a plurality of locations within the gas flow chamber 212, thereby ensuring an equal back pressure throughout the gas flow chamber 212. If more than one sparger 216 is used, they should preferably be located symmetrically with respect to the axis of the welding electrode 204, and preferably should be supplied with inlet pressures which are approximately equal.

Because the sintered material gas lens 208 provides a higher laminar flow rate than prior art lenses, and because it eliminates the need for a skirt around the cover gas flow 206, it is possible to mount a light source 218 adjacent to the gas lens 208 and within the laminar flow of cover gas 206. The shape of the light source 218 can be selected to minimize the turbulence generated in the cover gas flow 206, and furthermore, any such turbulence is offset by the high flow rate and columnar shape of cover gas 208 generated by the sintered material gas lens 206. Therefore an effective envelope of cover gas is still maintained at the weld puddle. This is an ideal location for such a light source 218, since it does not obstruct the operator's view of the weld puddle. More than one light source 218 or more than one lamp within a single light source 218 can be provided to minimize shadows.

The housing 201 can be designed to fit around an existing torch assembly 202, or can be custom designed as part of a new torch design. If an existing torch assembly 202 is used, the flow of cover gas 206 may be used alone, or in combination with a flow supplied through the existing torch assembly 202.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

I claim:

1. Apparatus for welding parts fitted together with a narrow welding groove comprising:
   a welding torch;
   a welding electrode extending from said welding torch and into said welding groove and operable to form a weld puddle at a bottom of said welding groove;
   means substantially outside of said welding groove for directing a laminar flow of cover gas along said electrode and into said welding groove to maintain an effective envelope of said cover gas covering said weld puddle,
   said means for directing gas further comprising a sintered material gas lens; and
   a gas flow chamber operable to supply said cover gas to said gas lens, and wherein the pressure of said cover gas in said gas flow chamber is in the range of 50–150 psig.

2. The apparatus of claim 1, wherein the pressure of said cover gas in said gas flow chamber is approximately 125 psig.

3. The apparatus of claim 1, further comprising two gas spargers within said gas chamber, said gas spargers located symmetrically in relation to the axis of said welding electrode.

4. The apparatus of claim 3, wherein the cover gas pressure at the inlet of each of said gas spargers is maintained approximately equal.

5. The apparatus of claim 1, further comprising a light source attached to said apparatus above said narrow welding groove and within said laminar flow of cover gas.

6. The apparatus of claim 1, wherein said gas lens comprises 34–90 micron sintered bronze material.

7. A welding torch comprising;
   a welding electrode;
   a means for supplying a laminar flow of cover gas along said welding electrode, said means for supplying comprising a gas lens;
   a light source located adjacent said gas lens and within said laminar flow of cover gas.

8. The welding torch of claim 7, wherein said gas lens comprises a sintered material.

9. The welding torch of claim 8, wherein said sintered material comprises sintered bronze.

10. Apparatus for welding a work-piece prepped for a narrow groove weld comprising:
    a welding torch positioned above said groove;
    a welding electrode extending from said welding torch and into said groove and operable to form a weld puddle at a bottom of said groove;
    means for directing a laminar flow of cover gas along said electrode and into said groove to maintain an effective envelope of said cover gas covering said weld puddle; and
    a means for lighting located adjacent said welding torch and above said groove and within said flow of cover gas.

11. The apparatus of claim 10, wherein said means for directing a laminar flow of cover gas further comprises a sintered material gas lens.

12. The apparatus of claim 11, further comprising a gas flow chamber operable to supply said cover gas to said gas lens, and wherein the pressure of said cover gas in said gas flow chamber is in the range of 50–150 psig.

13. The apparatus of claim 11, further comprising a gas flow chamber operable to supply said cover gas to said gas lens, a first gas sparger within said gas chamber, and a second gas sparger within said gas chamber located symmetrically with said first gas sparger in relation to the axis of said welding electrode.

14. The apparatus of claim 13, wherein the pressure of said cover gas in said gas flow chamber is in the range of 50–150 psig.

* * * * *